United States Patent [19]
Baldwin et al.

[11] Patent Number: 6,051,785
[45] Date of Patent: Apr. 18, 2000

[54] ELECTRICAL WIRING SWITCH AND RECEPTACLE LEVELING/PROTECTOR PLATE

[75] Inventors: Reginald A. Baldwin, Carrollton; Daniel T. Rego, Dallas, both of Tex.

[73] Assignee: Jackson Deerfiled Manufacturing Corporation, Dallas, Tex.

[21] Appl. No.: 09/094,013

[22] Filed: Jun. 9, 1998

[51] Int. Cl.[7] .................................................. H01H 9/02
[52] U.S. Cl. ................................ 174/54; 174/58; 174/55; 174/66; 174/67; 220/241; 220/242; 439/538
[58] Field of Search ................................ 174/54, 50, 53, 174/55, 58, 66, 67, 63, 61; 220/241, 242, 4.02, 3.8; 439/538, 539

[56] References Cited

U.S. PATENT DOCUMENTS

| | | |
|---|---|---|
| 1,796,226 | 3/1931 | Tombler . |
| 2,501,569 | 3/1950 | Korn .......................................... 174/53 |
| 2,506,212 | 5/1950 | Grohsgal ................................... 174/53 |
| 2,515,820 | 7/1950 | Clark ......................................... 40/134 |
| 4,479,317 | 10/1984 | Hanna .................................. 40/299.01 |
| 4,485,282 | 11/1984 | Lee ........................................ 200/51 R |
| 4,737,609 | 4/1988 | Yuhasz et al. ........................... 200/330 |
| 4,800,239 | 1/1989 | Hill .......................................... 174/66 |
| 5,287,665 | 2/1994 | Rath, Jr. .................................. 52/220.8 |
| 5,434,359 | 7/1995 | Schnell ..................................... 174/58 |

*Primary Examiner*—Kristine Kincaid
*Assistant Examiner*—Dhiru R Patel
*Attorney, Agent, or Firm*—Thompson & Knight L.L.P.

[57] ABSTRACT

An electrical wiring switch and receptacle leveling and protector plate includes a substantially planar base plate having an opening of a size to receive an electrical terminating component including a wiring switch, receptacle, or connector disposed thereon, a notch of a size to hold an outlet box mounting screw disposed an extent of an inner peripheral edge bounding the opening, and a gap of a size to receive a cover plate mounting screw disposed thereon offset below and aligned with the notch. The electrical wiring switch and receptacle leveling and protector plate also includes a substantially planar piece with a notch of a size to hold an outlet box mounting screw disposed on an extent of an outer peripheral edge thereof and a gap of a size to receive a cover plate mounting screw disposed thereon and offset above and aligned with the notch. Lastly, a mechanism is included for removably coupling the piece to the base plate within the opening thereof to thereby position the gaps and the notches of both the base plate and the piece along a common axis of symmetry with an electrical terminating component.

21 Claims, 5 Drawing Sheets

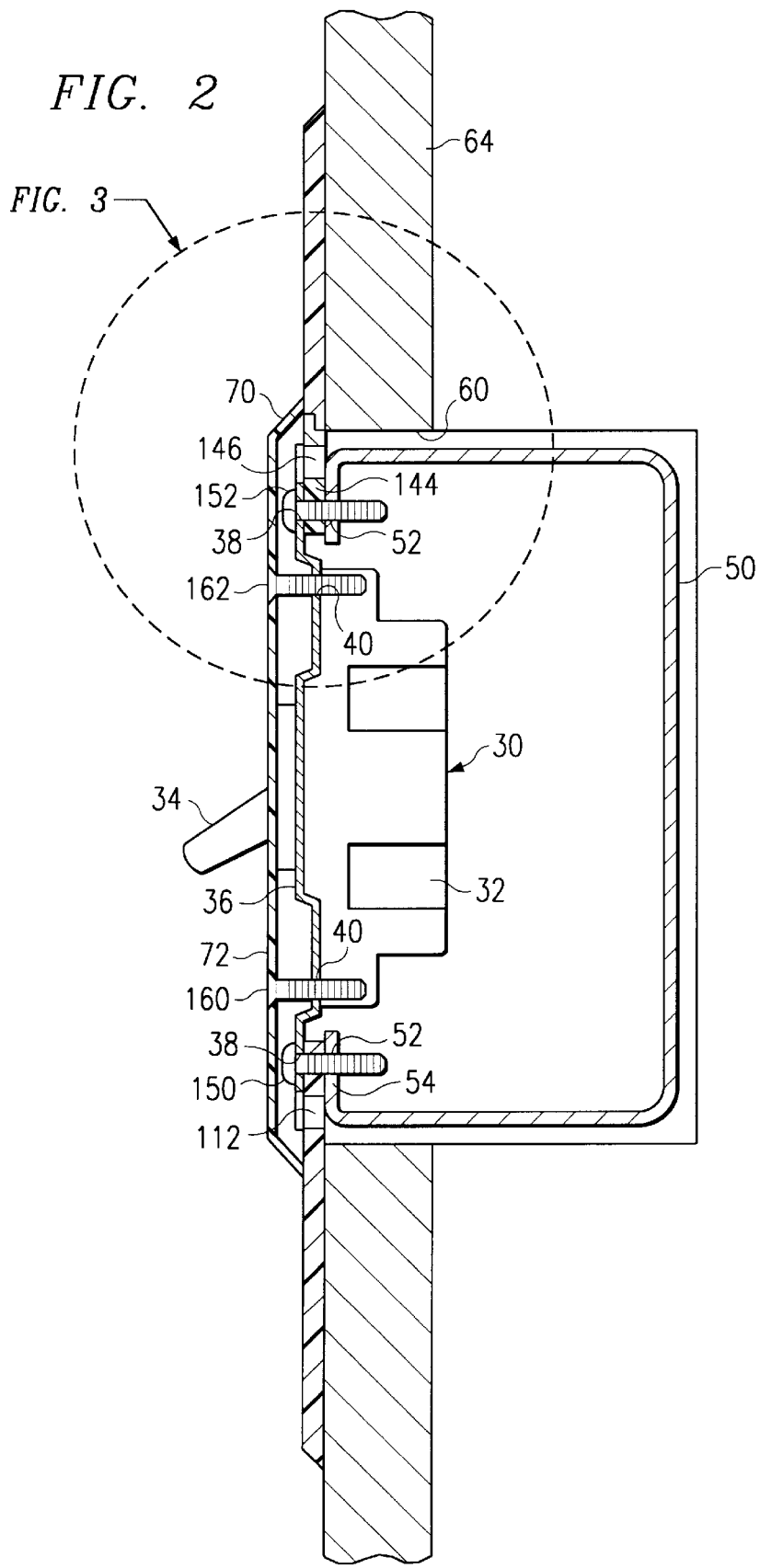

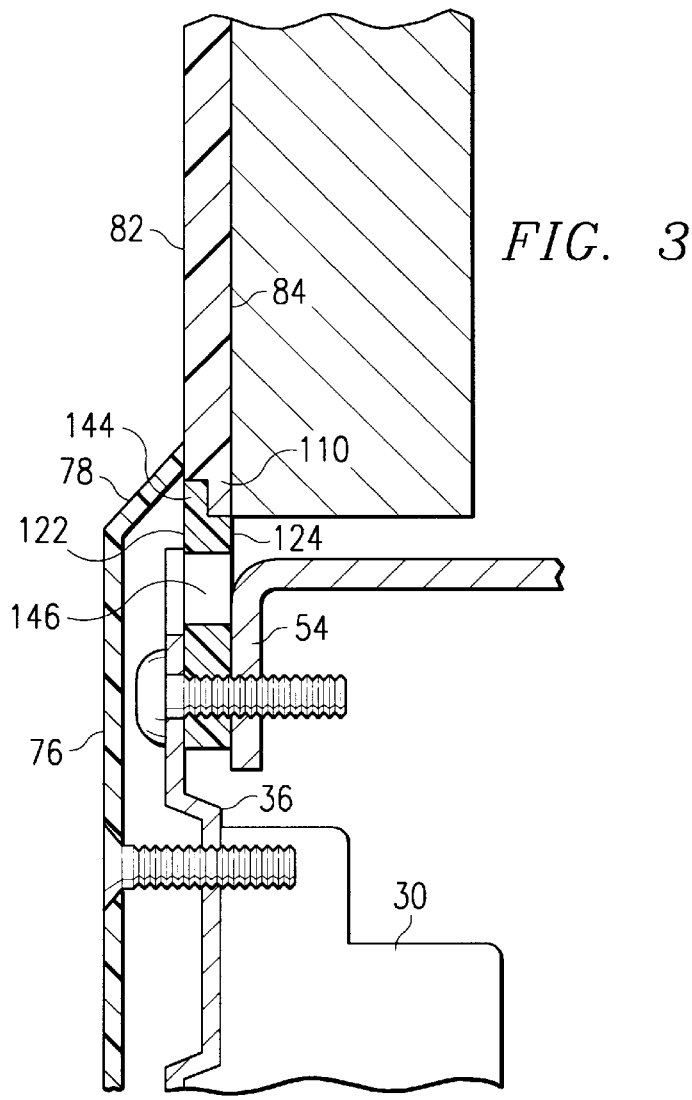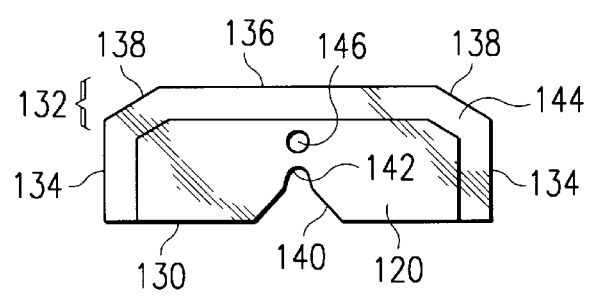

ELECTRICAL WIRING SWITCH AND RECEPTACLE LEVELING/PROTECTOR PLATE

FIELD OF THE INVENTION

The present invention relates to electrical wiring switch plates and electrical receptacle plates and more particularly pertains a combination electrical wiring switch and receptacle leveling and protector plate that allows a manually-actuated electrical wiring switch or an electrical receptacle to be properly installed on a surface such as a wall, floor, ceiling, or the like. The electrical wiring switch and receptacle leveling and protector plate further shields the nearby surface from soiling or damage when the wiring switch or receptacle associated therewith is used.

DESCRIPTION OF THE PRIOR ART

The use of wall surface protectors for the purpose of protecting a surface of a wall when using a wall-mounted light switch is known in the art. For example, U.S. Pat. No. 1,796,226 to Tombler discloses a wall surface protector for protecting the surface of a wall that includes a panel with an exposed face of greater dimension that is secured to the light switch wall cover. U.S. Pat. No. 2,515,820 to Clark discloses a luminous display unit and protector that has a plurality of display cards that can be secured between a transparent plate and the accompanying light switch cover plate. In addition, U.S. Pat. No. 4,800,239 to Hill discloses a decorative switch and receptacle wall plate that includes a decor plate, transparent shield, and an outer frame, all of which are attached to the light switch cover plate. However, since all of the aforementioned devices are attached directly to the light switch cover plate, the manual actuator or toggle of the light switch is recessed. Since less of the actuator is exposed, it is more difficult for a user to turn the light switch on and off. Furthermore, the previously described light switch protector plates do not provide a way to insure proper leveling of the associated light switch therewith or with the nearby wall surface.

SUMMARY OF THE INVENTION

The present invention substantially departs from the described prior art by providing an electrical wiring switch and receptacle leveling/protector plate that precludes an actuator of a wiring switch or an outlet of an electrical receptacle or connector from being recessed, thereby allowing for its ready use.

The present invention provides an electrical wiring switch and receptacle leveling/protector plate that allows an electrical wiring switch, receptacle, or connector to be properly installed and leveled on a wall.

The present invention provides an electrical wiring switch and receptacle leveling/protector plate that is easily installed for use with a currently operable conventional wiring switch, receptacle, or connector without having to disconnect this wiring switch or receptacle from its power source.

The present invention provides an electrical wiring switch and receptacle leveling/protector plate that protects a wall from soiling or damage due to use of a wiring switch or receptacle.

The present invention includes a base plate. The base plate has an opening disposed thereon of a size to receive an actuator of a wiring switch or an outlet of an electrical receptacle. The base plate includes a notch of a size to hold an outlet box mounting screw. This notch is disposed on an extent of an inner peripheral edge that bounds the opening of the base plate. The base plate has a gap disposed thereon of a size to receive a cover plate mounting screw. The gap on the base plate is offset below and substantially aligned with the notch.

A substantially planar piece or interchangeable mount is also included. The piece includes a notch of a size to hold an outlet box mounting screw. This notch is disposed on an extent of an outer peripheral edge of the piece. The piece also has a gap disposed thereon of a size to receive a cover plate mounting screw. The gap on the piece is offset above and substantially aligned with the notch.

Lastly, a mechanism is provided for removably coupling the piece to the base plate within the opening. The mechanism allows the gaps and the notches of both the base plate and the piece to be positioned along a common axis of symmetry to thereby allow a pair of outlet box mounting screws of an electrical wiring switch or electrical receptacle to be trapped and held therebetween.

BRIEF DESCRIPTION OF THE DRAWINGS

FIG. 2 is a cross-sectional view of the present invention in use with a wall-mounted tumbler-type wiring switch.

FIG. 3 is an enlarged cross-sectional view of a portion of the present invention of FIG. 2.

FIG. 5 is a plan view of the piece of the present invention.

DESCRIPTION OF THE PREFERRED EMBODIMENT

Figure 1:
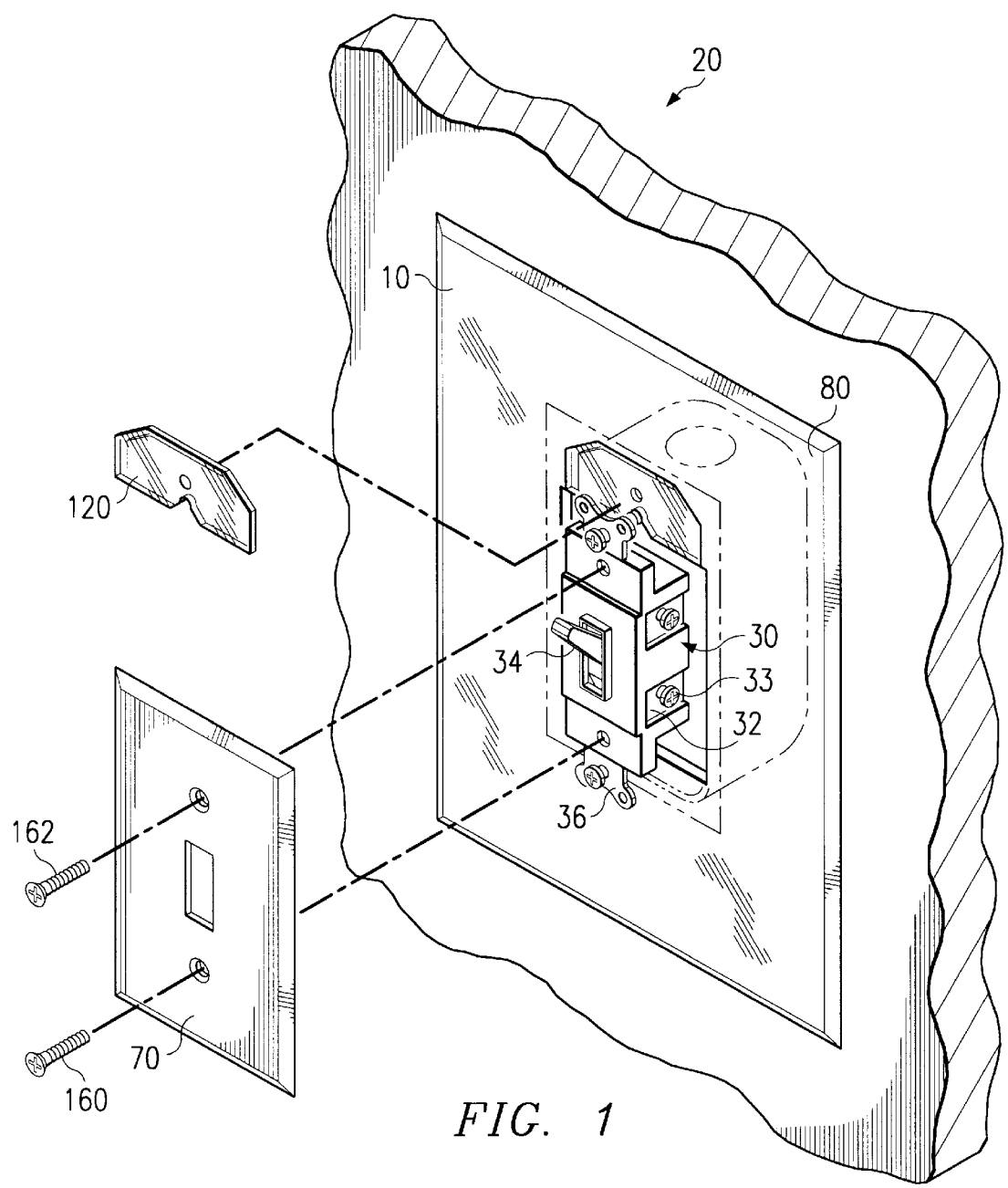
FIG. 1 is a perspective view of the present invention in use with a wall-mounted tumbler-type wiring switch.

Referring now to the drawings, and in particular, to FIG. 1 thereof, the preferred embodiment of the electrical wiring switch and receptacle leveling and protector plate is generally designated by the reference number 10. The present invention operates in combination with other associated components to create an electrical terminating assemblage 20.

The preferred embodiment of assemblage 20 includes at least one electrical terminating component such as an electrical wiring switch, electrical receptacle, or electrical connector, which may be characterized as a special type of electrical receptacle. The wiring switches or connectors that may be used with assemblage 20 include all the relatively small-capacity switches or low-voltage devices that are employed in interior wiring installations for controlling branch circuits or supplying electrical signals to lamps or appliances. The electrical receptacles that may be used as part of assemblage 20 include both single and duplex type and the like. As an example, a flush-mounted conventional tumbler-type electrical light switch 30 may be used. The light switch 30 includes a switching or terminating portion 32 mounted in a porcelain or composition molded case which is designed to be mounted inside a conventional outlet box. Terminating screws 33 extend from the terminating portion 32 of switch 30 to facilitate an electrical connection with unillustrated power source terminal wires. A manual actuator 34 extends from the light switch 30, and an elongated longitudinal steel or plastic mounting strap 36 is connected to the terminating portion 32.

Referring now to FIG. 2, the mounting strap 36 of switch 30 includes a first or outer pair of through holes 38 and a second or inner pair of through holes 40 formed thereon and aligned about a common axis of symmetry. The through holes 38 of the outer pair are each of a size to receive an outlet box mounting screw or bolt for mounting the switch 30 in a fixed position to an outlet box 50. The through holes 40 of the inner pair are each of a size to receive a cover plate mounting screw or bolt for mounting a cover plate 70 in a fixed position over the switch 30 and the outlet box 50.

The conventional dimensions of a wiring switch such as the light switch 30 or of an electrical receptacle used in assemblage 20 range from about 1 to 2 inches in depth, 1 7/16 to 2 inches in width, and 2 3/8 to 3 3/16 inches in length. The outer pair of through holes 38 on the mounting strap 36 of the wiring switch or receptacle is separated by a center-to-center distance of about 3 9/32 inches. The inner pair of through holes 40 on the mounting strap 36 of the wiring switch or receptacle is separated by a distance of about 2 3/8 inches.

A rigid metal or plastic outlet box 50 is also provided as part of the assemblage 20. The outlet box 50 has a central opening with a hollow space therein for receiving the wiring switch or receptacle. For example, when used with light switch 30, the outlet box is of a size to receive the terminating portion 32 of the light switch 30 therein. The outlet box has a pair of threaded through holes 52 disposed thereon. Each through hole 52 is formed on an extending lip 54 that protrudes inward from the opening of the outlet box 50. The through holes 52 of the outlet box 50 are aligned about a common axis of symmetry with a center-to-center spacing of about 3 9/32 inches such that they can be aligned with the outer pair of through holes 38 on the mounting strap 36. The outlet box 50 is disposed in a hole 60 formed in a wall 64 and secured to an unillustrated stud that is used in supporting the wall.

Figure 4:
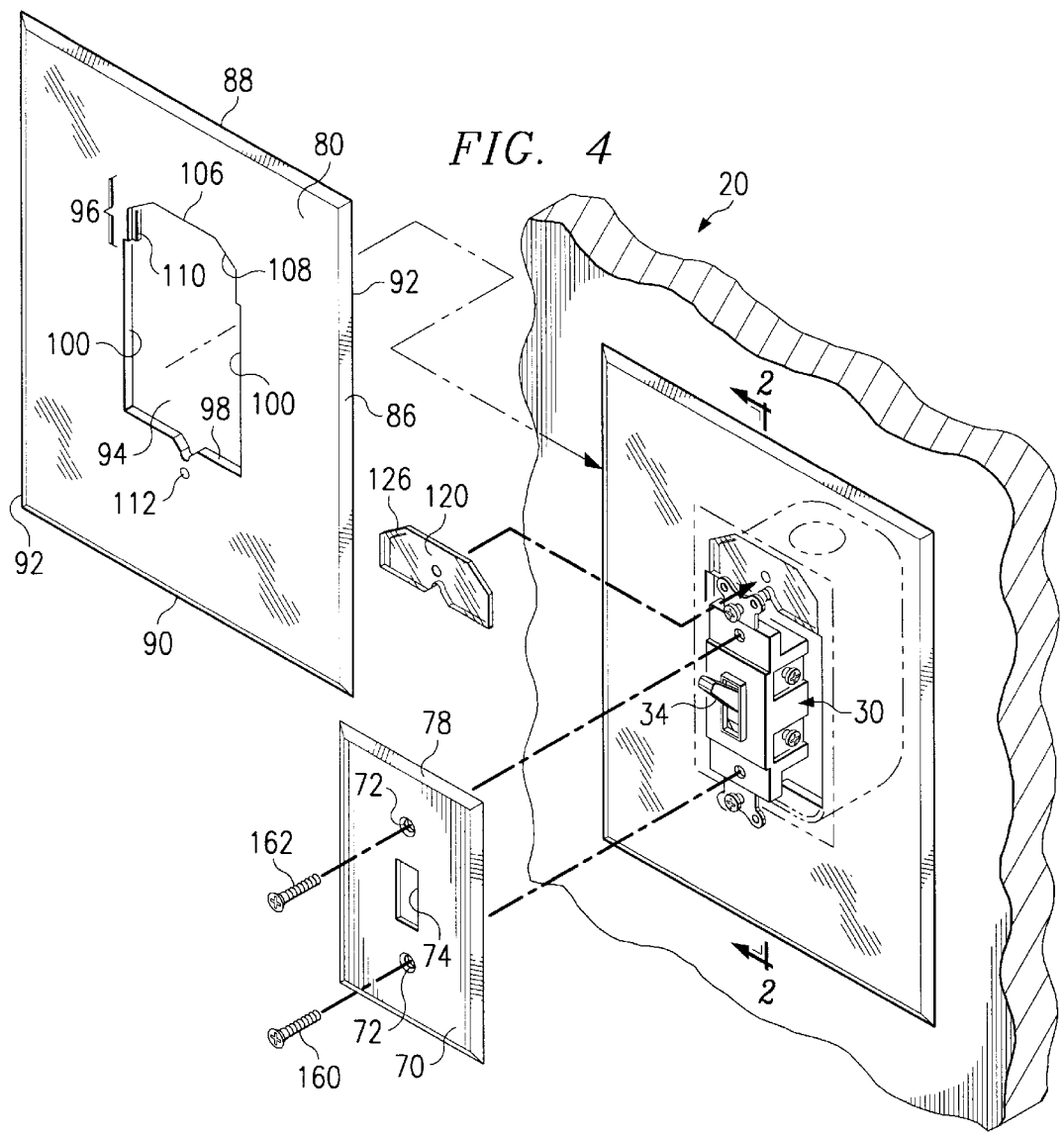
FIG. 4 is an exploded perspective view of the present invention.

Referring now to FIG. 4, the assemblage 20 includes a cover plate 70. The cover plate 70 is substantially planar, rigid, and rectangular in structure. It is preferably formed of plastic, but other materials known to those skilled in the art may be used such as wood, ceramic, or metal. The preferred embodiment of cover plate 70 includes a pair of through holes 72 disposed thereon and at least one opening 74 positioned between through holes 72 for receiving the actuator 34 of the light switch 30. The through holes 72 and opening 74 are aligned about a common axis of symmetry. As shown in FIG. 2, the center-to-center spacing of the through holes 72 is about 2 3/8 inches such that they can be aligned with the inner pair of through holes 40 on the mounting strap 36. The assemblage may also accommodate a variety of different types of single or multi-port cover plates, depending on the type of related switch, receptacle, or connector used. For example, toggle, rocker, push button, single/duplex/triplex or multi-plex receipt, louver, telephone, slotted, lighting, telephone jack, cable connector, multi-pin jack, or data connector cover plates and related electrical terminating components can be employed. Moreover, if an electrical terminating component or device is not employed for use as part of assemblage 20, even a blank or no-port cover plate can be accommodated. Referring now to FIG. 3, the cover plate has a flat face 76 and a beveled peripheral edge 78 that creates a slight offset space for accommodating the mounting strap 36 when placed in a coupled position with the switch 30.

Referring again to FIG. 1, the electrical wiring switch and receptacle protector plate 10 of assemblage 20 includes a base plate 80. The base plate is substantially planar, rigid, and rectangular in structure. It is preferably formed of a transparent plastic, but other materials known to those skilled in the art may be used such as wood, ceramic, or metal. Referring to FIGS. 3 and 4, the base plate has a front surface 82, a back surface 84, and a beveled outer periphery 86 that interconnects the surfaces. The outer periphery 86 of the base plate is formed of a straight short outer top edge 88, a straight short outer bottom edge 90, and two straight long outer side edges 92 interconnected therebetween. A central opening 94 disposed on the base plate and is aligned about a common axis of symmetry. The opening 94 is bounded by a periphery formed of a short inner to edge 96, a short inner bottom edge 98, and two straight long parallel inner side edges 100 interconnected therebetween.

Figure 6:
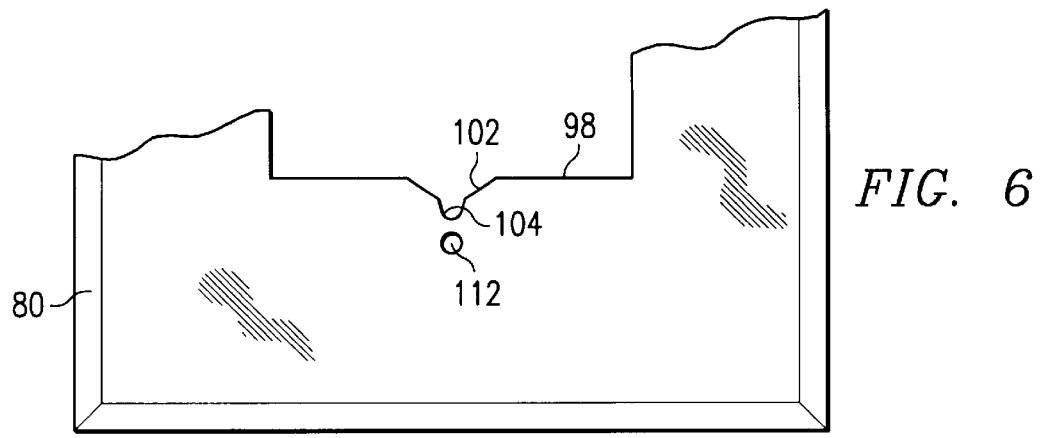
FIG. 6 is a fragmentary view of a lower extent of the base plate of the present invention.

Referring now to FIG. 6, a substantially V-shaped notch 102 disposed on a central extent of the inner bottom edge 98 of the base plate 80. In addition, a substantially semicircular or curved cutout 104 is disposed at an apex of the notch 102. The cutout 104 is adapted to receive and hold in place an outlet box mounting screw or bolt. Referring now to FIG. 4, the inner top edge 96 of the base plate has a straight inward edge portion 106, and a pair of opposed outward edge portions 108 extending outward to one of the inner side edges 100 of the base plate. Each edge portion 108 includes an angled upper segment, a short lower segment, and an intermediate segment therebetween. As shown in FIGS. 3 and 4, a portion of the inner top edge 96 that is located adjacent to the front surface 82 of the base plate 80 is recessed slightly inward to thereby create a peripheral lip 110. The base plate 80 also includes a through hole 112 disposed thereon. The through hole 112 is offset just below and aligned with the notch 102 along a first access of symmetry and is of a size to receive a cover plate mounting screw or bolt.

Referring again to FIG. 1, the assemblage 20 includes a piece 120 or interchangeable mount for use with switch plate 10. The piece 120 is substantially planar and rigid in structure. It is preferably formed of a transparent plastic material, but other materials known to those skilled in the art may be used such as wood, ceramic, or metal. As shown in FIGS. 3 and 4, the piece 120 has a front surface 122, a back surface 124, and an outer periphery 126 interconnecting the surfaces 122, 124.

As shown in FIG. 5, the outer periphery of the piece 120 is formed of a long lower edge 130, a short upper edge 132, and two side edges 134 interconnected therebetween. The upper edge 132 has a straight inward edge portion 136 and a pair of opposed straight outward edge portions 138. Each outward edge portion 138 extends at an angle to one of the side edges 134 of the piece. The lower edge 130 has an inverted and substantially V-shaped notch 140 disposed thereon at a central extent thereof. A substantially semicircular or curved cutout 142 is disposed at an apex of the notch. The cutout is adapted to receive and hold an outlet box mounting screw or bolt in place. As further shown in FIGS. 3 and 5, a portion of the upper edge 132 and a portion of the side edges 134 that are located adjacent to the back surface 124 of the piece are recessed slightly inward to thereby create a peripheral lip 144. The piece also includes a through hole 146 disposed thereon. The through hole 146 is offset just above and aligned with the notch 140 along a second access of symmetry and is of a size to receive a cover plate mounting screw or bolt.

As shown in FIGS. 3 and 4, the piece 120 is removably and frictionally engaged or coupled in an upper extent of the opening 94 of the base plate 80 such that the lips 110 and 144 are in facing contact. When engaged in this manner, the through holes 112, 144 and the notches 102, 140 of FIGS. 5 and 6 are aligned along a common axis of symmetry, and the front surfaces 82, 122 of FIG. 3 are in a common plane. Although the present invention employs this simple frictional-type coupling, other conventional methods for fastening the piece 120 and the base plate 80 can also be used, such as a snap-type fastener or a hook-and-eye fastener.

Referring now to FIG. 2, a pair of outlet box mounting screws 150, 152 is provided. First outlet box mounting screw 150 is disposed within the lower through hole of the outer through hole pair 38 of the mounting strap 36, the lower through hole 52 of the outlet box 50, and cutout 104 of the base plate 80. Referring now to FIGS. 2 and 5, second outlet box mounting screw 152 is disposed within the upper through hole of the outer through hole pair 38 of the mounting strap 36, the upper through hole 52 of the outlet box 50, and the cutout 142 of the piece 120 to thereby secure the base plate 80 and the piece 120 between the outlet box 50 and the mounting strap 36. In this configuration, the base plate 80 is held against the wall 64.

Lastly, referring to FIGS. 2 and 4, the assemblage 20 includes a pair of cover plate mounting screws 160, 162. The cover plate mounting screws 160, 162 are separately disposed within each of the through holes 72 of the cover plate 70 and the through holes on the inner pair 40 of the mounting strap 36 to thereby secure the cover plate 70 to the mounting strap 36 and against the base plate 80. In this configuration, the actuator 34 of the light switch 30 projects outward at a conventional length from the cover plate 70 for manipulation by a user.

The electrical wiring switch and receptacle plate 10 is also designed to be used with another type of wiring switch, wherein the center-to-center spacing between the through holes 40 on the mounting strap 36 of the wiring switch is about $3^{13}/_{16}$ inches, while the center-to-center spacing between the through holes 38 on the mounting strap 36 of the wiring switch remains about $3^{9}/_{32}$ inches. An example of a wiring switch of this type is a Class A ground-fault interrupter used to feed conventional household electrical receptacles. In order to secure the cover plate 70 to the ground-fault interrupter, first cover plate mounting screws 160 is disposed within through hole 112 of the base plate 80 and then secured within one of the through holes 38 of the mounting strap 36. Second cover plate mounting screw 162 is disposed within the through hole 146 of the piece and then secured within the other through hole 38 of the mounting strap 36. Note that instead of using through holes 112 and 146, elongated gaps or channels could be fashioned to allow for allow for small adjustments in positioning.

Note in particular that the present invention can be secured to an electrical wiring switch such as light switch 30 or an electrical receptacle that is already in place without having to disconnect it from the power source. For example, in order to accomplish installation of the wiring switch and receptacle leveling and protector plate 10 with the conventional light switch 30, screws 160, 162 and the cover plate 70 are removed. Screws 150, 152 are then loosened slightly to allow light switch 30 to be pulled slightly outward and away from the outlet box 50 and wall 64. The base plate 80 is disposed over the light switch 30 such that the switch extends through opening 94. The base plate 80 is then positioned such that the lower outlet box mounting screw 150 is trapped within the cutout 104 of the notch 102 and the back surface 84 is positioned against the wall. Piece 120 is now angularly positioned at an upper extent of the opening with the cutout 142 of the notch 140 engaged with and trapping screw 152. Now, the piece 120 is forced into place against the base plate such that the base plate and the piece are parallel with the wall. Now, screws 150, 152 are tightened, and the cover plate 70 is replaced and secured with screws 160, 162. Thus, the present invention can be readily installed through only the use of a conventional screw driver.

Furthermore, during the process of constructing or redecorating a home or office, an electrical outlet box 50 will generally be mounted to construction studs before the facing material (such as sheet rock or paneling) is applied to form the wall. In mounting the outlet box before the facing material, the thickness of the facing material is often estimated inaccurately, thereby causing the corresponding electrical switch to be unintentionally recessed. This results in an unsightly appearance when the cover plate 70 is installed. Because the wiring switch and receptacle plate 10 is placed directly behind the mounting strap 36 of the electrical wiring switch or electrical receptacle, the outlet box will be correctly aligned and the cover plate 70 will be correctly positioned flush against the surface of wall 64.

In normal use of a manually actuated wiring switch or receptacle, it is unavoidable that the nearby wall area around the switch becomes soiled due to body oil, dirt, and grime. This soiling over time causes in premature paint, wallpapering or paneling wear on the wall, thereby leading to an unsightly appearance. An attempt to improve the appearance of only the soiled area is generally unsuccessful because of the difficulty in matching paints, wallpapers or paneling, which usually change color over time. The installation of the wiring switch and receptacle plate 10—with a much larger surface area than that of the cover plate 70—will prevent the soiling of the wall and extend the life of the original wall treatment.

Figure 7:
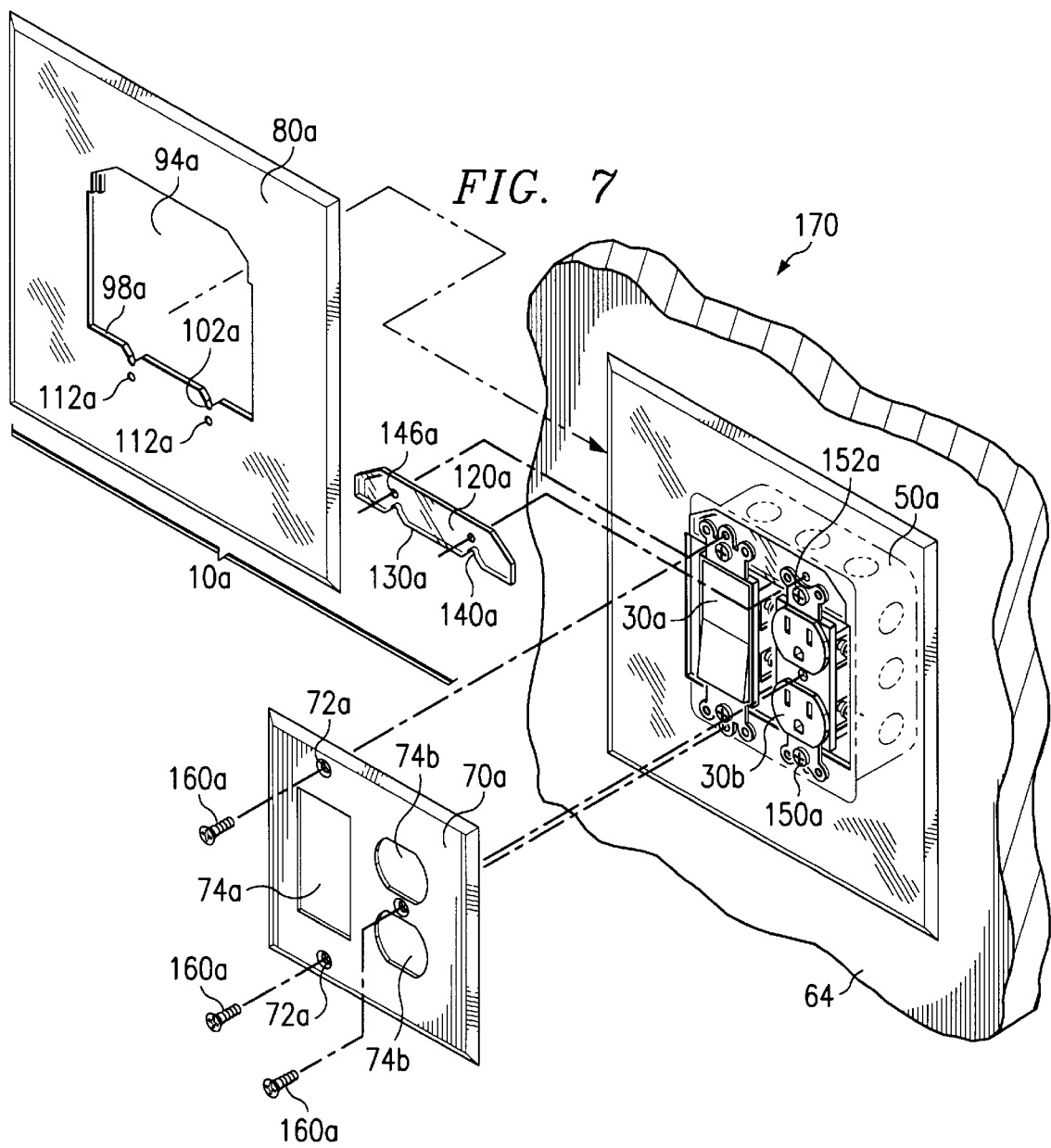
FIG. 7 is a perspective view of an alternate embodiment of the present invention in use with a wall-mounted rocker-type wiring switch and a duplex electrical receptacle.

The design of the wiring switch and receptacle plate 10 can also be readily extended to accommodate multiple switches or receptacles. For example, a second embodiment of an electrical terminating assemblage 170, including the wiring switch and receptacle leveling and protector plate 10a, is shown in FIG. 7. This embodiment is used in conjunction with duplex-type electrical terminating component configurations. For example, an arrangement of duplex-type electrical terminating components can include but is not limited to wiring switches such as a toggle-type switch 30a or electrical receptacles such as a double-grounding type receptacle 30b. The electrical terminating components are securable to a duplex-type outlet box 50a through the use of outlet box mounting screws 150a, 152a.

In this second embodiment, the base plate 80a has an extended opening 94a, an inner edge 98a adjacent to the opening, and a pair of spaced notches 102a disposed on edge 98a. The shape of the upper extent of the opening 94a is substantially similar to that of opening 94 of base plate 80. Each notch 102a is of a size to hold a conventional outlet box mounting screw 150a.

The piece 120a of electrical terminating assemblage 170 has an edge 130a and a pair of spaced notches 140a disposed on of edge 130a. The shape of piece 120a is substantially similar to that of piece 120. Each notch 140a of the piece 120a is of a size to hold a conventional outlet box mounting screw 152a. The piece 120a is frictionally and removably engaged with the base plate 80a within the opening 94a thereof to align the one of the notches 102a of both base plate and one of the notches 140a of the piece along a first common axis and align the other notch of the base plate and the other notch of the piece along a second common axis.

In this configuration, the outlet box mounting screws 150a, 152a of the switch 30a and receptacle 30b are trapped or held in place between the associated notches 102a, 140a. When the outlet box mounting screws 150a, 152a are tightened, the base plate 80a is secured against the wall 64 and the switch 30a and receptacle 30b are secured against the base plate 80a and the piece 120a.

In addition, electrical terminating assemblage 170 includes a cover plate 70a that has both a switch opening 74a and receptacle openings 74b. A plurality of cover plate mounting screws 160a is disposed in through holes 72a of cover plate 70a and is used for coupling the cover plate 70a, the switch 30a, and the receptacle 30b against the base plate 80a. Through holes 112a on the base plate 80a and through holes 146a on the piece 120a are used to secure the cover plate 70a to a longer and larger switch, such as a Class A ground-fault interrupter.

Those skilled in the art will readily recognize that the wiring switch and receptacle plate 10 can be readily modified to accommodate a multitude of electrical terminating components and configurations with simple extensions to the present design. Furthermore, as in the preferred embodiment the base plate and the piece can be readily installed without fully disconnecting the terminating electrical components from their sources of electrical power or from the wall.

What is claimed is:

1. An electrical wiring switch and receptacle leveling and protector plate comprising:

a base plate having an opening disposed thereon of a size to receive an electrical terminating component, an inner peripheral edge bounding the opening, a notch disposed on an extent of the inner peripheral edge of a size adapted to hold a first component mounting screw used for fixedly mounting the electrical terminating component;

a substantially planar piece having an outer peripheral edge with a notch disposed on an extent thereof of a size adapted to hold a second component mounting screw used for fixedly mounting the electrical terminating component; and means for removably coupling the piece to the base plate within the opening thereof to position the notches of both the base plate and the piece such as to allow the notches to trap the screws therebetween and thus permit a portion of the fixedly mounted electrical terminating component to be extended through the opening for use.

2. The electrical wiring switch and receptacle leveling and protector plate as set forth in claim 1 wherein the notches the base plate and the piece are positioned along a common axis of symmetry when the base plate and the piece coupled together.

3. The electrical wiring switch and receptacle leveling and protector plate as set forth in claim 1 wherein the base plate is substantially planar.

4. The electrical wiring switch and receptacle leveling and protector plate as set forth in claim 1 wherein the electrical terminating component is a wiring switch.

5. The electrical wiring switch and receptacle leveling and protector plate as set forth in claim 1 wherein the electrical terminating component is an electrical receptacle.

6. The electrical wiring switch and receptacle leveling and protector plate as set forth in claim 1 wherein the electrical terminating component is an electrical connector.

7. The electrical wiring switch and receptacle leveling and protector plate as set forth in claim 1 wherein the base plate has a gap disposed thereon of a size to receive a cover plate mounting screw.

8. The electrical wiring switch and receptacle leveling and protector plate as set forth in claim 1 wherein the base plate has a gap disposed thereon of a size to receive a cover plate mounting screw, and with the gap of the base plate offset from and aligned with the notch of the baseplate.

9. The electrical wiring switch and receptacle leveling and protector plate as set forth in claim 1 wherein the piece has a gap disposed thereon of a size to receive a cover plate mounting screw.

10. The electrical wiring switch and receptacle leveling and protector plate as set forth in claim 1 wherein the piece has a gap disposed thereon of a size to receive a screw, and with the gap of the piece offset from and aligned with the notch thereof.

11. The electrical wiring switch and receptacle leveling and protector plate as set forth in claim 1 wherein the opening on the base plate is aligned along a common axis of symmetry.

12. The electrical wiring switch and receptacle leveling and protector plate as set forth in claim 1 wherein the notch on the base plate is substantially V-shaped.

13. The electrical wiring switch and receptacle leveling and protector plate as set forth in claim 1 wherein a curved cutout is disposed on the notch on the base plate.

14. The electrical wiring switch and receptacle leveling and protector plate as set forth in claim 1:

wherein the notch on the base plate is substantially V-shaped; and wherein a substantially semicircular cutout is disposed at an apex of the notch on the base plate.

15. The electrical wiring switch and receptacle leveling and protector plate as set forth in claim 1:

wherein a portion of the inner peripheral edge of the base plate is recessed slightly inward to thereby create a peripheral lip; and wherein a portion of the outer peripheral edge is recessed slightly inward to thereby create a peripheral lip; and wherein the piece is removably engaged in an extent of the opening of the base plate with the lips in facing contact.

16. The electrical wiring switch and receptacle leveling and protector plate as set forth in claim 1 wherein the notch on the piece is substantially V-shaped.

17. The electrical wiring switch and receptacle leveling and protector plate as set forth in claim 1 wherein a curved cutout is disposed on the notch on the piece.

18. The electrical wiring switch and receptacle leveling and protector plate as set forth in claim 1:

wherein the notch on the piece is substantially V-shaped; and wherein a substantially semicircular cutout is disposed at an apex of the notch on the piece.

19. An electrical wiring switch and receptacle protector and leveling plate comprising:

a substantially planar rigid base plate having a front surface, a back surface, and a beveled outer periphery interconnecting the surfaces formed of a straight short outer top edge, a straight outer bottom edge, and two straight long outer side edges therebetween, and with the base plate further having a opening disposed thereon of a size to receive an electrical terminating component and with the opening bounded by a periphery formed of an inner top edge, a straight short inner bottom edge, and two straight long parallel inner side edges therebetween, wherein the inner bottom edge has a substantially V-shaped notch disposed thereon and a substantially semicircular cutout disposed at an apex of the notch, wherein the inner top edge has a straight inward edge portion, and a pair of opposed outward edge portions each extending to one of the inner side edges thereof, and wherein a portion of the inner top edge located adjacent to the front surface is recessed slightly inward to thereby create a peripheral lip, and with the base plate further having a through hole disposed thereon and offset below and aligned with notch; and a substantially planar rigid piece having a front surface, a back surface, and an outer periphery interconnecting the surfaces formed of a long lower edge, a short upper edge, and two side edges therebetween, wherein the upper edge has a straight inward edge portion and a pair of opposed straight outward edge portions each extending at an angle to one of the side edges thereof, wherein the lower edge has a substantially V-shaped notch disposed thereon with a substantially semicircular cutout disposed at an apex of the notch, and wherein a portion of the upper edge and a portion of the side edges located adjacent to the back surface of the piece are recessed slightly inward to thereby create a peripheral lip, and with the piece further having a through hole disposed thereon and offset above and aligned with the notch; and wherein the piece is removably engaged in an extent of the opening of the base plate opposite the notch thereof with the lips in facing contact to thereby position the through holes and the notches along a common axis of symmetry and further position the front surfaces in a common plane.

20. An electrical terminating assemblage comprising:

a cover plate having an opening;

a substantially planar base plate having an opening disposed thereon, an inner peripheral edge bounding the opening, a notch disposed on an extent of the inner peripheral edge adapted to hold a first screw;

a substantially planar piece having an outer peripheral edge and a notch disposed on an extent of the outer peripheral edge adapted to hold a second screw;

means for removably coupling the piece to the base plate within the opening thereof to position the notches of both the base plate and the piece along a common axis of symmetry;

an electrical terminating component having a portion thereof disposed within the opening of the base plate and the opening of the cover plate;

means for coupling the base plate against a wall and the electrical terminating component against the base plate and the piece; and means for coupling the cover plate and the electrical terminating component against the base plate.

21. A electrical terminating assemblage comprising:

an electrical terminating component having a mounting strap coupled to thereto and a first and a second pair of through holes formed on the mounting strap;

a wall having a hole formed thereon;

an outlet box disposed within the hole of the wall and having a pair of through holes disposed thereon and a opening of a size for receiving the electrical terminating component;

a cover plate having a pair of through holes disposed thereon and a opening of a size for receiving a portion of the electrical terminating component;

a substantially planar rigid base plate having a front surface, a back surface, and a beveled outer periphery interconnecting the surfaces formed of a straight short outer top edge, a straight short outer bottom edge, and two straight long outer side edges therebetween, and with the base plate further having a opening disposed thereon adapted to receive the electrical terminating component and with the opening bounded by a periphery formed of an inner top edge, a straight short inner bottom edge, and two straight long parallel inner side edges therebetween, wherein the inner bottom edge has a substantially V-shaped notch disposed thereon and a substantially semicircular cutout disposed at an apex of the notch, wherein the inner top edge has a straight inward edge portion, and a pair of opposed outward edge portions each extending to one of the inner side edges thereof, and wherein a portion of the inner top edge located adjacent to the front surface is recessed slightly inward to thereby create a peripheral lip, and with the base plate further having a through hole disposed thereon and offset below and aligned with notch thereof along a first axis of symmetry; and a substantially planar rigid piece having a front surface, a back surface, and an outer periphery interconnecting the surfaces formed of a long lower edge, a short upper edge, and two side edges therebetween, wherein the upper edge has a straight inward edge portion and a pair of opposed straight outward edge portions each extending at an angle to one of the side edges thereof, wherein the lower edge has a substantially V-shaped notch disposed thereon with a substantially semicircular cutout disposed at an apex of the notch, and wherein a portion of the upper edge and a portion of the side edges located adjacent to the back surface of the piece are recessed slightly inward to thereby create a peripheral lip, and with the piece further having a through hole disposed thereon and offset above and aligned with the notch thereof along a second axis of symmetry; and wherein the piece is removably engaged in an upper extent of the opening of the base plate with the lips in facing contact to thereby position the through holes and the notches along a common axis of symmetry and further position the front surfaces in a common plane;

a pair of outlet box mounting screws with one of the box mounting screws disposed within one of the through holes of the first pair on the mounting strap of the electrical terminating component, one of the through holes of the outlet box, and the cutout of the notch the base plate, and with the other outlet box mounting screw disposed within the other through hole of the first pair on the mounting strap of the electrical terminating component, the other through hole of the outlet box, and the cutout of the notch of the piece to thereby secure the base plate and the piece between the outlet box and the electrical terminating component whereby the base plate is held against the wall; and a pair of cover plate mounting screws disposed within the through holes of the cover plate and the through holes of the second pair on the mounting strap of the electrical terminating component to thereby secure the cover plate to the electrical terminating component and against the base plate.

* * * * *

UNITED STATES PATENT AND TRADEMARK OFFICE
CERTIFICATE OF CORRECTION

PATENT NO. : 6,051,785
DATED : April 18, 2000
INVENTOR(S) : Reginald A. Baldwin et al.

It is certified that error appears in the above-identified patent and that said Letters Patent is hereby corrected as shown below:

On the face of the patent, change the spelling of Assignee from "Jackson Deerfiled Manufacturing Corporation" to --Jackson Deerfield Manufacturing Corporation--;
    in the Abstract, line 4, change "including" to --such as--;
    in Col. 4, line 13, change "to edge 96," to --top edge 96,--.

Signed and Sealed this

Twenty-second Day of May, 2001

Attest:

NICHOLAS P. GODICI

Attesting Officer    Acting Director of the United States Patent and Trademark Office